United States Patent [19]

Janney

[11] Patent Number: 4,894,194

[45] Date of Patent: Jan. 16, 1990

[54] METHOD FOR MOLDING CERAMIC POWDERS

[75] Inventor: Mark A. Janney, Knoxville, Tenn.

[73] Assignee: Martin Marietta Energy Systems, Inc., Oak Ridge, Tenn.

[21] Appl. No.: 158,485

[22] Filed: Feb. 22, 1988

[51] Int. Cl.$^4$ ............................................. C04B 38/06
[52] U.S. Cl. ..................................... 264/109; 264/63; 264/236; 264/344
[58] Field of Search ................... 264/63, 109, 236, 344

[56] References Cited

U.S. PATENT DOCUMENTS

| | | | |
|---|---|---|---|
| 2,939,199 | 7/1960 | Strivens | 25/156 |
| 3,351,688 | 11/1967 | Kingery | 264/63 |
| 3,998,917 | 12/1976 | Adelman | 264/63 |
| 4,011,291 | 3/1977 | Curry | 264/43 |
| 4,113,480 | 9/1978 | Rivers | 75/214 |
| 4,144,207 | 3/1979 | Ohnsorg | 260/23 S |
| 4,197,118 | 4/1980 | Wiech, Jr. | 75/228 |
| 4,478,790 | 10/1984 | Huther | 419/54 |
| 4,560,527 | 7/1984 | Kato | 264/56 |
| 4,587,068 | 5/1986 | Borase | 264/63 |

FOREIGN PATENT DOCUMENTS 54-21413 2/1979 Japan .

OTHER PUBLICATIONS

Cullen, F. M. et al, Forming Precision Shapes from Powdered Materials, IBM Technical Disclosure Bulletin, vol. 14, No. 10, Mar. 1972.

Primary Examiner—James Derrington
Attorney, Agent, or Firm—James D. Griffin; Bruce M. Winchell

[57] ABSTRACT

A method for molding ceramic powders comprises forming a slurry mixture including ceramic powder, a dispersant for the metal-containing powder, and a monomer solution. The monomer solution includes at least one multifunctional monomer, a free-radical initiator, and an organic solvent. The slurry mixture is transferred to a mold, and the mold containing the slurry mixture is heated to polymerize and crosslink the monomer and form a firm polymer-solvent gel matrix. The solid product may be removed from the mold and heated to first remove the solvent and subsequently remove the polymer, whereafter the product may be sintered.

6 Claims, No Drawings

METHOD FOR MOLDING CERAMIC POWDERS

The U.S. Government has rights in this invention pursuant to blanket purchase agreement No. DE AC05-840R21400 awarded by U.S. Department of Energy Contract with Martin Marietta Energy Systems, Inc.

FIELD OF THE INVENTION

The present invention relates to a method for molding ceramic powders. More particularly, the present invention relates to a method for molding ceramic powders wherein the ceramic powders are added to a monomer solution to form a slurry mixture which is formed into a solid, shaped product. The method is particularly adaptable for forming complex shaped bodies from the ceramic powders.

BACKGROUND OF THE INVENTION

Methods for forming ceramic powders into complex shapes are desirable in many areas of technology. For example, such methods are required for producing advanced, high temperature structural parts such as heat engine components, recuperators and the like from ceramic powders. Generally, two methods are presently known for forming ceramic powders into complex or intricately shaped parts. Specifically, one method comprises machining a green blank to the desired shape. However, this method has significant drawbacks in that the machining is time consuming, expensive, and, in a practical sense, inapplicable to some complex or varied cross-sectional shapes, for example, turbine rotors. A second method for forming ceramic powders into complex or intricately shaped parts comprises injection molding a composition which comprises the ceramic powder and a polymeric and/or waxlike binder as a vehicle for the ceramic powder.

For example, the Strivens U.S. Pat. No. 2,939,199 discloses a method of forming articles from ceramic powders wherein the ceramic powders are mixed with a vehicle comprising a thermosetting material and a plasticizer, and the resultant mixture is injection molded into a mold of a desired shape and heated to cure the thermosetting component. The vehicle is then removed from the molded part by low pressure distillation or by solvent extraction. A similar method is disclosed in the Kingery et al U.S. Pat. No. 3,351,688 wherein the ceramic powder is mixed with a binder such as paraffin at a temperature where the binder is liquid, and the resulting mixture is cast into a mold of the desired shape. The binder is permitted to solidify so that a green piece is formed having a uniform density. Use of a paraffin wax binder for molding ceramic powders into desired shapes is also disclosed in the Curry U.S. Pat. No. 4,011,291 and the Ohnsorg U.S. Pat. No. 4,144,207. The Rivers U.S. Pat. No. 4,113,480 and the Wiech, Jr. U.S. Pat. No. 4,197,118 disclose additional methods for molding parts from metal powders by mixing the powders with binder materials and injection molding the resultant mixtures. Additional methods of interest which employ binder materials are also disclosed in the Huther et al U.S. Pat. No. 4,478,790 and the Kato U.S. Pat. No. 4,460,527.

The aforementioned injection molding techniques using various binder materials also have significant drawbacks. Generally, the binder removal times are unacceptably long, being up to a week or more in some instances, and binder removal often creates cracks or warpage in the molded parts. Additionally, after binder removal strength of the molded parts is relatively low whereby increased breakage of the parts occurs during subsequent handling. It is also difficult to provide molded parts having a large cross-section, for example, parts greater than one inch in cross-section, or having widely varying cross-sections, that is, with both thick and thin regions, using the injection molding techniques.

Thus, the presently known methods for forming complex and intricately shaped parts from ceramic powders are disadvantageous in various respects. Moreover, a need exists for a method for molding ceramic powders into complex and intricately shaped parts, which method overcomes the disadvantages of the known techniques.

SUMMARY OF THE INVENTION

Accordingly, it is an object of the present invention to provide a method for molding ceramic powders into solid, shaped products. It is a related object of the present invention to provide a method for molding ceramic powders into complex and intricately shaped parts. It is an additional object of the invention to provide a method for molding ceramic powders into parts of large and/or variable cross-sections. It is a further object of the invention to provide a method for molding ceramic powders into solid, shaped products using a binder vehicle, wherein the time necessary for binder removal is reduced.

These and additional objects are provided by the method for molding ceramic powders according to the present invention. Generally, the method of the present invention relates to the molding of ceramic powders into green products wherein a multifunctional monomer solution is used as a binder vehicle and the controlled thermal polymerization of the multifunctional monomer in solution serves as a setting mechanism. More specifically, the method according to the present invention comprises forming a slurry mixture including ceramic powder, a dispersant for the ceramic powder, and a monomer solution. The monomer solution includes at least one multifunctional monomer, a free-radical initiator, and an organic solvent. The slurry mixture is transferred to a mold, and the mold containing the slurry mixture is heated at a temperature and for a time sufficient for the monomer to polymerize and crosslink to form a firm polymer-solvent gel matrix. The resultant green product is of exceptionally high strength and may be dried to remove the solvent in a relatively short time, for example, in several hours. After drying, the product may be further heated to remove the polymer and may subsequently be fired to sinter the product to a high density.

These and additional objects and advantages will be more fully understood in view of the following detailed description.

DETAILED DESCRIPTION

The present invention provides a method for molding ceramic powders into solid, shaped products. The solid, shaped products which result are in the green state whereby they may be further heated to remove the organic components and then sintered at high temperatures to provide high density products. The method of the present invention is particularly suited for forming solid parts of complex or intricate shapes and/or of large or varied cross-sections. Ceramic powders suitable for use in the methods of the present invention include, but are not limited to, alumina, fused silica, magnesia, zirconia, spinels, mullite, glass frits, tungsten carbide, silicon carbide, boron nitride, silicon nitride, and mixtures thereof.

In accordance with an important feature of the method of the present invention, the ceramic powder is mixed with a dispersant for the powder and a monomer solution to form a slurry mixture. The monomer solution provides a low viscosity vehicle for the ceramic powder. Additionally, when heated, the monomer solution polymerizes and crosslinks to form a firm, strong polymersolvent gel matrix. The gel matrix immobilizes the ceramic powder in the desired shape of the mold in which the slurry mixture is heated. The resultant "green" product exhibits exceptionally high strength.

Various dispersants for ceramic powders are known in the art and are appropriate for use in the present invention. Care should be exercised however in order to select a dispersant which does not interact with the components of the monomer solution, particularly the initiator or the solvent. A particular dispersant may be evaluated for suitability with a particular ceramic powder and a particular monomer solution by mixing small amounts of the respective components and judging the flow properties of the resultant mixture, whether the resultant mixture exhibits a notable yield point, and/or whether the mixture is dilatant. Preferred dispersants include ethoxylated alkylphenol dispersants. Generally, the dispersant is used in a small amount, by volume, as compared with the amount, by volume, of the ceramic powder included in the mixture.

The monomer solution which is mixed with the ceramic powder and the dispersant to form the slurry mixture includes at least one multifunctional monomer, a free-radical initiator compound and an organic solvent. Generally, a multifunctional monomer includes at least two functional groups, for example, vinyl or allyl groups, or mixtures thereof. In accordance with a preferred embodiment of the present invention, the monomer solution includes at least one multifunctional acrylate monomer. In an additionally preferred embodiment, the monomer solution comprises a mixture of at least two multifunctional acrylate monomers. Generally, the amount of monomer included in the monomer solution determines the degree of hardness of the resulting solid, shaped product. Generally, an exceptionally hard green product can be formed using no greater than about 50 volume percent of monomers in the monomer solution, and in a preferred embodiment, the monomer solution comprises from about 10 to about 50 volume percent monomer.

The monomer solution further comprises a free-radical initiator compound for initiating the polymerization and crosslinking of the monomer when the slurry mixture is heated. Various thermally activated free-radical initiator compounds are known in the polymer art and are suitable for use in the method of the present invention. Preferred free radical initiator compounds include organic peroxides and hydroperoxides and azo or diazo compounds. The free-radical initiator is generally inactive at ambient temperatures so that the shelf-life of the monomer solution is relatively long. However, once the slurry mixture containing the monomer solution is heated, the reaction rate of the initiator compound is relatively high whereby polymerization and crosslinking of the multifunctional monomers is easily and quickly achieved. The amount of initiator included in the monomer solutions is generally small as compared with the amount of multifunctional monomer in accordance with conventional polymerization methods.

The organic solvent which is included in the monomer solution may comprise any organic solvent which is a solvent for the multifunctional monomers, exhibits a low vapor pressure at the temperature at which the multifunctional monomer polymerizes and crosslinks, and exhibits a relatively low viscosity. Preferred solvents include, but are not limited to, phthalate esters, dibasic esters, high-boiling point petroleum solvents, long chain alcohols, and pyrollidones. Generally, the solvent is included in the monomer solution in an amount greater than about 50 volume percent.

The ceramic powder, the dispersant and the monomer solution may be combined in any suitable manner. In a preferred embodiment, the slurry mixture is formed by dissolving the dispersant in the monomer solution and then adding the ceramic powder to the solution. The resultant slurry mixture is then transferred to a mold, and the mold containing the slurry mixture is heated at a temperature and for a time sufficient for the monomer to polymerize and crosslink to form a firm polymer-solvent gel matrix. Although the exact temperature at which polymerization an crosslinking occurs depends on the particular free-radical initiator compound and the particular multifunctional monomers which are included in the monomer solution, generally the temperature should be greater than about 100° C., and preferably in the range of about 100° to 120° C. Similarly, the time necessary to form a firm polymer-solvent gel matrix is dependent on the particular monomer, solvent and free-radical initiator compound. Generally, the mold containing the slurry mixture should be heated for at least five minutes and preferably is heated for a period of from about 5 to about 30 minutes in order to polymerize and crosslink the monomer and form the firm polymer-solvent gel matrix. After heating, resultant shaped, solid product may be cooled to ambient temperature and removed from the mold. The product is in a wet, green condition in that it contains solvent and is in the unsintered form. Wet, green products have exhibited extreme strength and toughness.

The wet, green product may subsequently be heated in order to substantially remove the organic solvent and provide a dry product. Although the specific temperature and time necessary for drying the product depends on the specific metal-containing powder and monomer solution employed, generally drying may be effected by heating at a temperature greater than about 130° C., preferably at approximately 150° C., in an oven for a period greater than about two hours, preferably for a period of from about 2 to about 6 hours. Thus, the drying time in the method of the invention is substantially reduced as compared with known methods. Additionally, the polymer may be substantially removed from the product by further heating at a higher temperature, for example, greater than about 500° C. Finally, the solid, shaped product may be sintered to form a high density body. Sintering temperatures for various ceramic powders are well known in the art. Alternatively, substantial removal of the polymer may be accomplished as a low temperature step of the sintering process.

While injection molding is preferred for use in the method of the present invention, other molding techniques, including extrusion molding, may also be employed. Moreover, any conventional additives known in the ceramic processing arts, for example, mold release agents, may be included in the slurry mixtures for their known functions.

The following Examples further demonstrate the method of the present invention.

EXAMPLE 1

A monomer solution was prepared comprising 1 part by volume (1 cc) trimethylol propane triacrylate (TMPTA) monomer, 9 parts by volume (9 cc) hexanedioldiacrylate (HDODA) monomer, 5 parts by volume (5 cc) of an initiator solution prepared by mixing 5 grams of benzoylperoxide initiator in 100 parts by volume (100 cc) of a dibasic ester solvent (DBE solvent supplied by DuPont), and 10 parts by volume (10 cc) DBE solvent. The resultant monomer solution contained approximately 40 volume percent monomer. A slurry mixture was then prepared comprising 10 parts by volume (10 cc, 40 g) alumina powder supplied by Reynolds Aluminum (RC152DBM), 0.9 parts by volume (0.9 cc) of a dispersant for the alumina which comprised Triton X-100 (an ethoxylated octylphenol supplied by Rohm & Haas Company), and 9.4 parts by volume (9.4 cc) of the monomer solution. The slurry mixture contained approximately 50 volume percent solids. The slurry was cast into a mold and heated for approximately 8 minutes at 110° C. to effect polymerization and crosslinking of the monomer and to provide a firm polymer-solvent gel matrix. The mold was removed from the heating oven to reveal that a hard, green ceramic product had been formed. The product was repeatedly dropped from laboratory bench height to the ground and did not exhibit any cracking or breakage. The product was then dried by heating in an oven at 150° C. to a constant weight in approximately 3.5 hours.

EXAMPLE 2

A dry green ceramic product was formed generally in accordance with the procedure of Example 1 except that the monomer solution comprised 1 part by volume TMPTA monomer, 4 parts by volume HDODA monomer, 5 parts by volume of the initiator solution and 15 parts by volume of the DBE solvent. The slurry mixture included 10 parts by volume alumina, 1 part by volume of the Triton X-100 dispersant and 9 parts by volume of the monomer solution. The slurry mixture was cast into a mold and heated at a temperature of 110° C. for approximately 13 minutes in order to provide a solid, shaped product. The product was then dried in accordance with the procedures set forth in Example 1.

EXAMPLE 3

A green ceramic product was produced generally in accordance with the procedures set forth in Example 2 except that dibutyl phthalate solvent was substituted for the DBE solvent in both the initiator solution and the monomer solution. The slurry mixture was cast into a mold and heated at 110° C. for approximately 15 minutes to produce a hard green product. The green product was then dried in accordance with the procedures set forth in Example 1.

EXAMPLE 4

A monomer solution was prepared including 2 parts by volume TMPTA monomer, 3 parts by volume HDODA monomer, 15 parts by volume dibutylphthalate solvent and 5 parts by volume of an initiator solution prepared by combining 5 grams of benzoylperoxide in 100 cc of dibutylphthalate. A slurry mixture was then prepared by combining 25 parts by volume alumina, 2 parts by volume of a dispersant comprising Solsperse 3000$^R$ (a proprietary dispersant composition supplied by ICI, Americas, Inc.), and 18 parts by volume of the monomer solution. The slurry mixture comprised approximately 55 volume percent solids and was heated as set forth in the previous Examples to provide a solid, shaped green product. The green product was then dried in accordance with the procedures set forth in Example 1.

EXAMPLE 5

The general procedure of Example 4 was used to prepare a monomer solution containing 6 parts by volume TMPTA monomer, 9 parts by volume HDODA monomer, 45 parts by volume of the dibutylphthalate solvent and 15 parts by volume of the initiator solution. A slurry mixture was prepared containing 50 parts by volume alumina, 6 parts by volume of the Triton X-100 dispersant and 34 parts by volume of the monomer solution. The resultant slurry mixture was cast into a mold and heated as set forth in the previous Examples to form a solid, shaped green product which was then dried as set forth in the previous Examples.

The wet, green products prepared in Examples 1–5 exhibited extreme strength and toughness. Additionally, the dried products were subsequently sintered at 1600° C. for approximately one hour to produce 97 percent dense sintered bodies.

The preceding Examples are set forth to illustrate specific embodiments of the invention and are not intended to limit the scope of the methods or compositions of the present invention. Additional embodiments and advantages within the scope of the claimed invention will be apparent to one of ordinary skill in the art.

What is claimed is:

1. A method for molding ceramic powders, comprising:
    (a) forming a slurry mixture comprising ceramic powder, a dispersant for said ceramic powder, and a monomer solution consisting essentially of trimethylol propane triacrylate monomer, hexanedioldiacrylate monomer, a free-radical initiator compound and an organic solvent;
    (b) transferring said slurry mixture into a mold;
    (c) heating said mold containing said slurry mixture at a temperature of about 100° to 120° C. for at least 5 minutes to cause said monomers to polymerize and crosslink to form a firm polymer-solvent gel matrix, whereby said slurry mixture is formed into a solid, shaped product;
    (d) removing said solid, shaped product from said mold;
    (e) heating said solid, shaped product at a temperature greater than about 130° C. for about 2 to 6 hours to substantially remove said organic solvent from said product; and
    (f) further heating said solid, shaped product at a temperature greater than about 500° C. for a time sufficient to substantially remove said polymer from said product.

2. A method as defined by claim 1, wherein the monomer solution comprises from about 10 to about 50 volume percent multifunctional monomers.

3. A method as defined by claim 1, wherein the ceramic powder is selected from the group consisting of alumina, fused silica, magnesia, zirconia, spinels, mullite, glass frits, tungsten carbide, silicon carbide, boron nitride and silicon nitride powders, and mixtures thereof.

4. A method as defined by claim 2 wherein the organic solvent is selected from a group consisting of phthalate esters, dibasic esters, high-boiling point petroleum solvents, long chain alcohols, and pyrollidones.

5. The method of claim 1 wherein said free-radical initiator compound is selected from the group consisting of organic peroxides and hydroperoxides, and azo and diazo compounds.

6. A method for molding ceramic powders, comprising:
   forming a slurry mixture comprising ceramic powder, a dispersant for said ceramic powder and a monomer solution, said monomer solution consisting essentially of
   (a) trimethylol propane triacrylate monomer
   (b) hexane-dioldiacrylate monomer
   (c) a free-radial initiator compound selected from the group consisting of organic peroxides and hydroperoxides, and azo and diazo compounds, and
   (d) an organic solvent selected from the group consisting of phathalate esters, dibasic esters, high-boiling point petroleum solvents, long chain alcohols and pyrollidones,
   said monomers being from about 10 to 50 volume percent in said monomer solution;
   transferring said slurry mixture into a mold;
   heating said mold containing said slurry mixture at a temperature of about 110° C. for about 8 to 15 minutes to cause said monomers to polymerize and crosslink to form a firm polymer-solvent gel matrix, whereby said slurry mixture is formed into a solid, shaped product;
   removing said solid, shaped product from said mold;
   heating said solid, shaped product at a temperature greater than about 130° C. for about 2 to 6 hours to substantially remove said organic solvent from said product; and
   further heating said solid, shaped product at a temperature greater than about 500° C. for a time sufficient to substantially remove said polymer from said product.

* * * * *